Feb. 8, 1966     V. J. PICOZZI     3,234,419

CAST ROTOR FOR A DYNAMOELECTRIC MACHINE

Filed Jan. 15, 1962

INVENTOR.
VINCENT J. PICOZZI

BY *James R. Campbell*

ATTORNEY

United States Patent Office 3,234,419
Patented Feb. 8, 1966

3,234,419
CAST ROTOR FOR A DYNAMOELECTRIC
MACHINE
Vincent J. Picozzi, Scotia, N.Y., assignor to General
Electric Company, a corporation of New York
Filed Jan. 15, 1962, Ser. No. 166,091
3 Claims. (Cl. 310—211)

The invention described herein relates to dynamoelectric machines and more particularly to an improved mounting arrangement for a squirrel cage rotor.

Conventional squirrel cage rotors comprise a magnetic core having closed slots in which molten aluminum is cast to form the winding and end rings on opposite ends of the core. Small rotors of this design do not present serious vibration problems but when the rotor proportions exceed certain length to shaft diameter ratios, changes in dynamic balance occurs when the rotor is placed under load and conductor bars comprising the winding increase in temperature. One theory advanced in explanation of this condition is that blow holes appear in the end rings and when the rotor becomes hot, non-uniform end ring expansion takes place thus resulting in rotor unbalance which ultimately appears as vibrations in the shaft.

Although blow holes contribute to the vibration problem, I believe another and perhaps more important contributing factor is that the conductor bars do not freeze uniformly in the slots during casting and therefore different bars around the rotor periphery contain different amounts of stress. Also, since the slot walls are not perfectly smooth, the aluminum freezes around the inwardly protruding portions of individual laminations forming the slot walls and the bars then become locked in position. When subsequent heating occurs, the bars expand differentially and cause rotor distortion which results in the application of a bending moment to the shaft of sufficient magnitude to establish a considerable degree of dynamic unbalance. Since the bending moment is a function of the length of the rotor body, it is apparent that rotors of long length will be adversely affected.

Dynamic unbalance conditions in rotors of long length have long been considered a problem and one known construction for minimizing vibration consists of a short annular ring mounted on the shaft with a longer sleeve or tube immovably fixed thereover so that the shaft, annular ring and sleeve do not move relative to each other. The rotor laminations are then positioned on the outer surface of the sleeve. Since the sleeve is of longer length than the annular ring, a space is provided between the sleeve inner surface and the shaft thereby providing a construction capable of accommodating shaft twisting or bending.

The disadvantage of this kind of construction is that both the annular ring and the sleeve superimposed thereon take up space which cannot be occupied by the active magnetic material in the laminations, thus requiring the use of more magnetic material. For a given horsepower rating, the rotor therefore must be made of a larger diameter which results in a more expensive construction. Also, the shaft, annular ring and sleeve must be machined to close tolerances to permit their assembly by shrink fit processes in order to prevent their movement with respect to each other when the rotor is placed in operation.

It is well known that shaft deflection is a function of the stiffness of the shaft and the unbalance of magnetic forces. When size limitations during the design stage are placed on the outer diameter of a rotor, it is apparent that the use of space for the sleeves will directly affect the stiffness of the shaft because it must be of a smaller diameter than otherwise could be employed if the cylinders were not used. Moreover, the use of rotors of long axial length would require sleeves of corresponding length and because the forces would be applied to the sleeve supporting the laminations, which is unsupported throughout a substantial portion of its length, distortion of the sleeve more than likely would occur unless it were made of extremely thick cross section.

It therefore is apparent that the need exists for a squirrel cage rotor design which permits the manufacture of rotors of any length without concern for the limitations imposed by vibrations resulting from non-uniform expansion of the rotor end rings and bar conductors.

The primary object of my invention therefore is to provide an improved design for a squirrel cage rotor which permits manufacture thereof in any desired diameter and length.

Still another object of my invention is to provide a construction which offsets the adverse effects resulting from non-uniform expansion of conductor bars and end rings in a squirrel cage rotor.

In carrying out my invention a portion of the laminations comprising a rotor core are attached directly to the shaft surface while the remaining portions thereof are positioned in spaced relationship with the shaft for minimizing the adverse effects resulting from non-uniform expansion of conductors and end rings in the rotor. It will be apparent to those skilled in the art that utilization of this kind of construction minimizes the application of a bending moment to the shaft which results in vibrations when the rotor is operated in a motor.

While the specification concludes with claims particularly pointing out and distinctly claiming the subject matter which I regard as my invention, it is believed the invention will be better understood from the following description taken in connected with the accompanying drawing in which:

Figure 1:
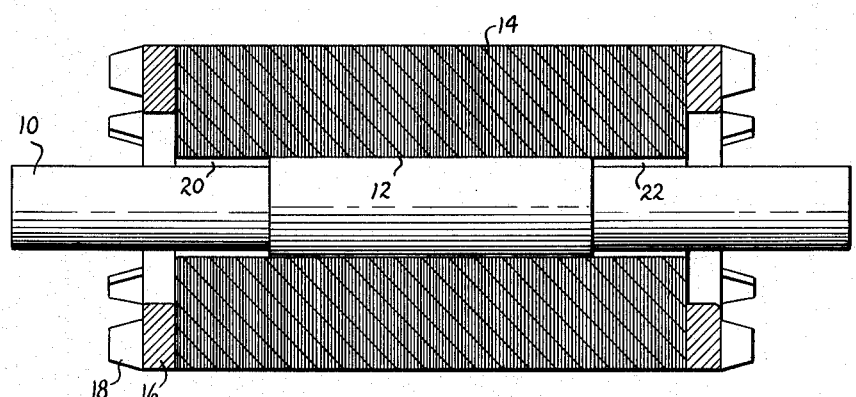
FIGURE 1 is a cross sectional view in elevation, partly in section, illustrating how the laminations of a rotor are disposed on a shaft surface.

Referring now to the drawing wherein like reference characters designate like or corresponding parts throughout the several views, there is shown in FIGURE 1, a shaft 10 having a flange 12 formed on its outer peripheral surface and intermediate the shaft length. A magnetic core comprising a multitude of silicon steel laminations 14 contains a squirrel cage winding of the usual design which terminates in end rings 16 and fan blades 18 disposed on opposite ends of the core. As illustrated in FIGURE 1, when the rotor is shrunk onto the shaft, only those laminations near the central part of the rotor core are positioned in immovable contact with the flange 12 of greater diameter on the shaft surface. A tight fit between the parts therefore occurs in this area while those laminations not in contact with the shaft surface form a loose fit therewith as indicated at 20 and 22 on opposite sides of the flange 12.

Figure 2:
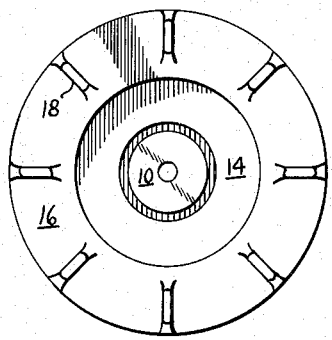
FIGURE 2 is an end view of the rotor shown in FIGURE 1.
Figure 3:
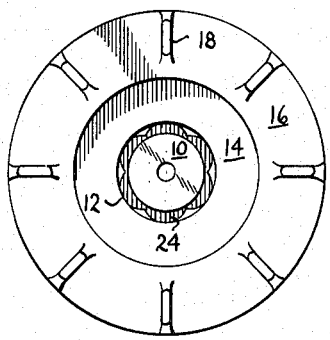
FIGURE 3 illustrates a modification of the design of the shaft for supporting the laminated magnetic core.

In a modification of the invention shown in FIGURE 3, the shaft is machined with a cloverleaf design and the magnetic core is shrunk thereon in the same manner as that illustrated in FIGURES 1 and 2. The difference in construction in this embodiment is that the inner surface of the laminations contact a lesser surface area on the shaft.

To determine the effect of this kind of construction a long two-pole rotor having a squirrel cage winding therein was mounted by means of a shrink fit on a shaft and rotated at a conventional speed. The rotor had a diameter of 11" and a blow hole approximately 17" long appeared in the main body of an end ring. During operation, the rotor exhibited a substantial degree of change in dynamic balance when the motor was placed under load and the rotor body temperature increased. The reason for such dynamic unbalance which exhibited itself in the form of vibrations in the shaft is attributable to the non-uniform expansion of the active metal in the end rings, in addition to the differential expansion of the long conductor bars in the rotor slots. Test results show that with this kind of design, substantial risks would be encountered in placing this size rotor in a stator core and operating it under load for a long period of time.

The same rotor was dissassembled and rebuilt with the rotor body firmly attached to the shaft intermediate the stack of laminations, with a loose fit on the ends of rotor body in the manner described above. Tests were repeated and it was found that the problems associated with dynamic unbalance had been minimized to the point where vibrations resulting from a thermal shift of material no longer were present.

It will be apparent that in lieu of providing a shaft having a greater diameter between its ends for supporting the rotor core, the shaft could be of the same diameter but two different sets of laminations are used for supporting the rotor body on the shaft surface. In this case, the bore of the laminations adapted for attachment directly to the shaft surface would be of a diameter substantially the same as the diameter of the shaft. However, the other laminations positioned on opposite sides of those which contact the shaft, would have a larger diameter bore and therefore be out of contact with the shaft surface. When bending moments originate in the magnetic core, either one or both ends thereof not supported by the shaft deform inwardly, but still stay out of contact with the shaft surface because of the space provided between the core and shaft surfaces. Since distortion of the shaft does not occur, no opportunity exists for establishing vibrations which are detrimental to motor operation due to shaft bending.

Although the above disclosure has been directed towards solving problems associated with forces created by dynamic unbalance in large size rotors, it will be apparent that the teachings are applicable equally to rotors of smaller size, particularly those where the ratio between rotor length and diameter is great. Also, the teachings are applicable to most any design of shaft supported member which expands axially in response to heat, other than rotors for dynamoelectric machines of the type described herein. In some cases, it may be desirable to provide an overhang on one end of the shaft only and this construction could effectively be used in this type of design.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A rotating member comprising a body having elements therein capable of changes in dimension when undergoing a change in temperature, said body having a portion of its inner surface in direct contact with a shaft, a void space between the body inner surface and the shaft surface on opposite sides of said portion for permitting movement of the unsupported parts of the body toward the shaft when said elements change in dimension non-uniformly with changes in temperature.

2. A squirrel cage rotor comprising a shaft having an enlarged portion intermediate its length of greater diameter than the remainder of the shaft, a magnetic core having an axial length greater than said enlarged portion and including a cast winding and end rings, a central bore in said core of a diameter approximately the same as the diameter of said enlarged portion on the shaft, said core being mounted on said enlarged portion so that when the windings and end rings expand under the influence of heat those portions of the core not supported by the enlarged portion are permitted to deflect inwardly toward the shaft for minimizing the establishment of vibrations therein.

3. A squirrel cage rotor comprising a magnetic core having a winding and end rings cast therein, said core being directly mounted on a shaft throughout at least a portion of the core length, a space between said shaft and the inner surface of the core on opposite sides of the portion mounted on the shaft, thereby providing an area towards which a core can move when the latter is subjected to distortion caused by the non-uniform expansion of the winding and end rings.

References Cited by the Examiner

UNITED STATES PATENTS

| 263,146 | 8/1882 | Edison | 310—201 |
|---|---|---|---|
| 286,415 | 10/1883 | Fuller | 310—265 |
| 1,950,197 | 3/1934 | Taylor | 310—211 |
| 2,740,910 | 4/1956 | Fleischer | 310—211 |

FOREIGN PATENTS 1,116,311  11/1961  Germany.

ORIS L. RADER, *Primary Examiner.*

MILTON O. HIRSHFIELD, *Examiner.*

D. F. DUGGAN, P. L. McBRIDE, *Assistant Examiners.*